April 12, 1955  R. C. FERGASON  2,705,860
COTTON PICKER SLAT
Filed March 18, 1952  4 Sheets-Sheet 4
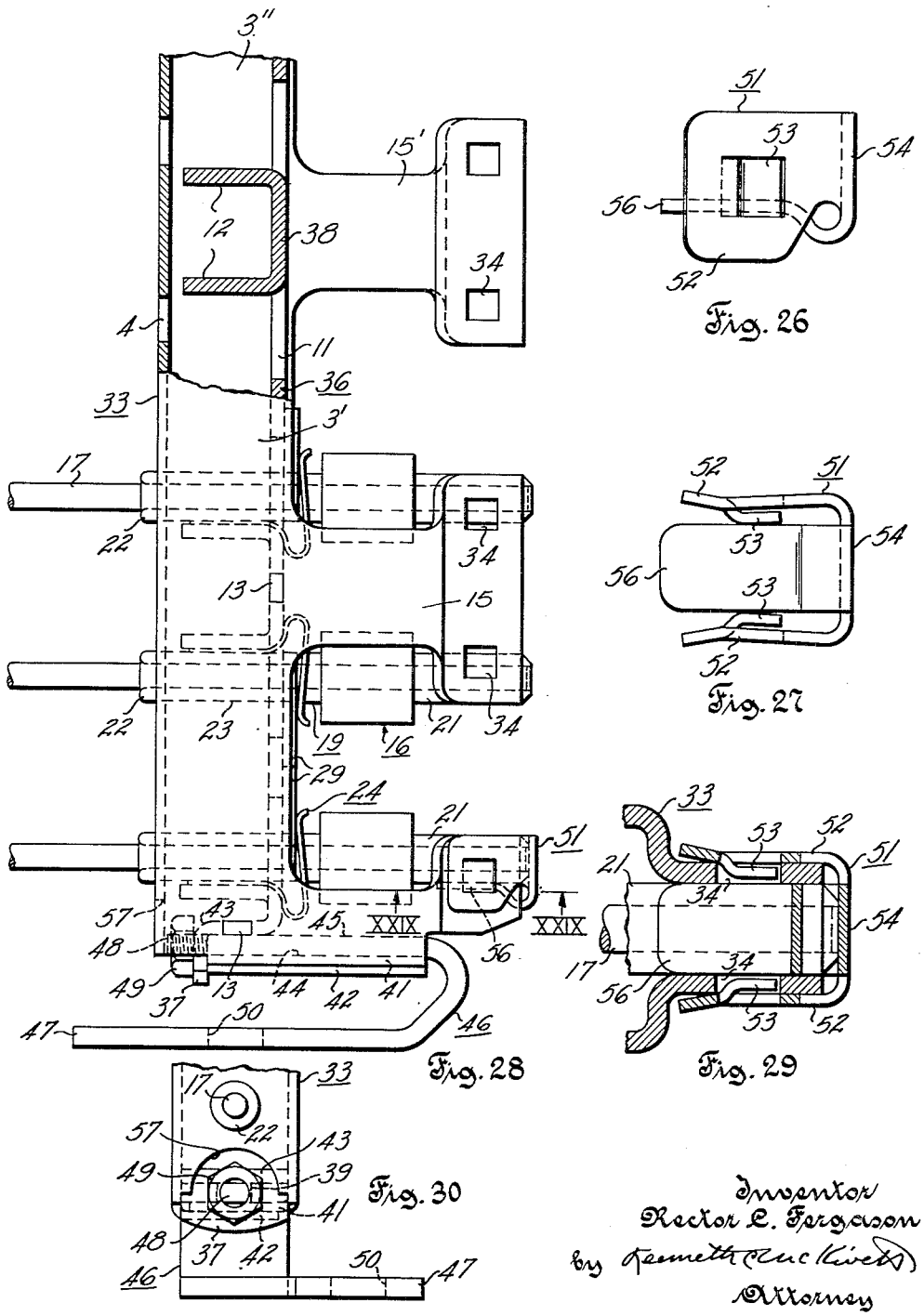

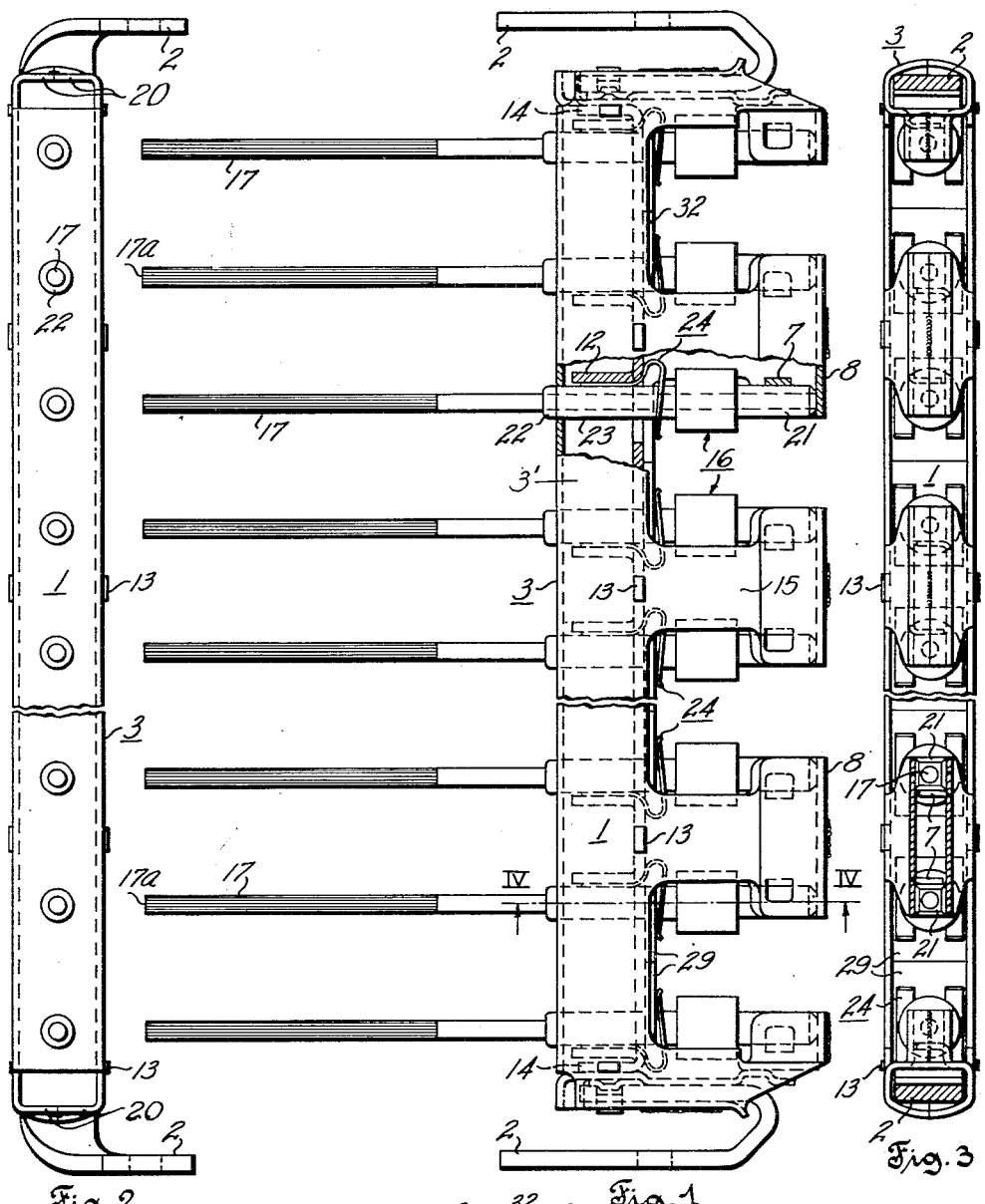

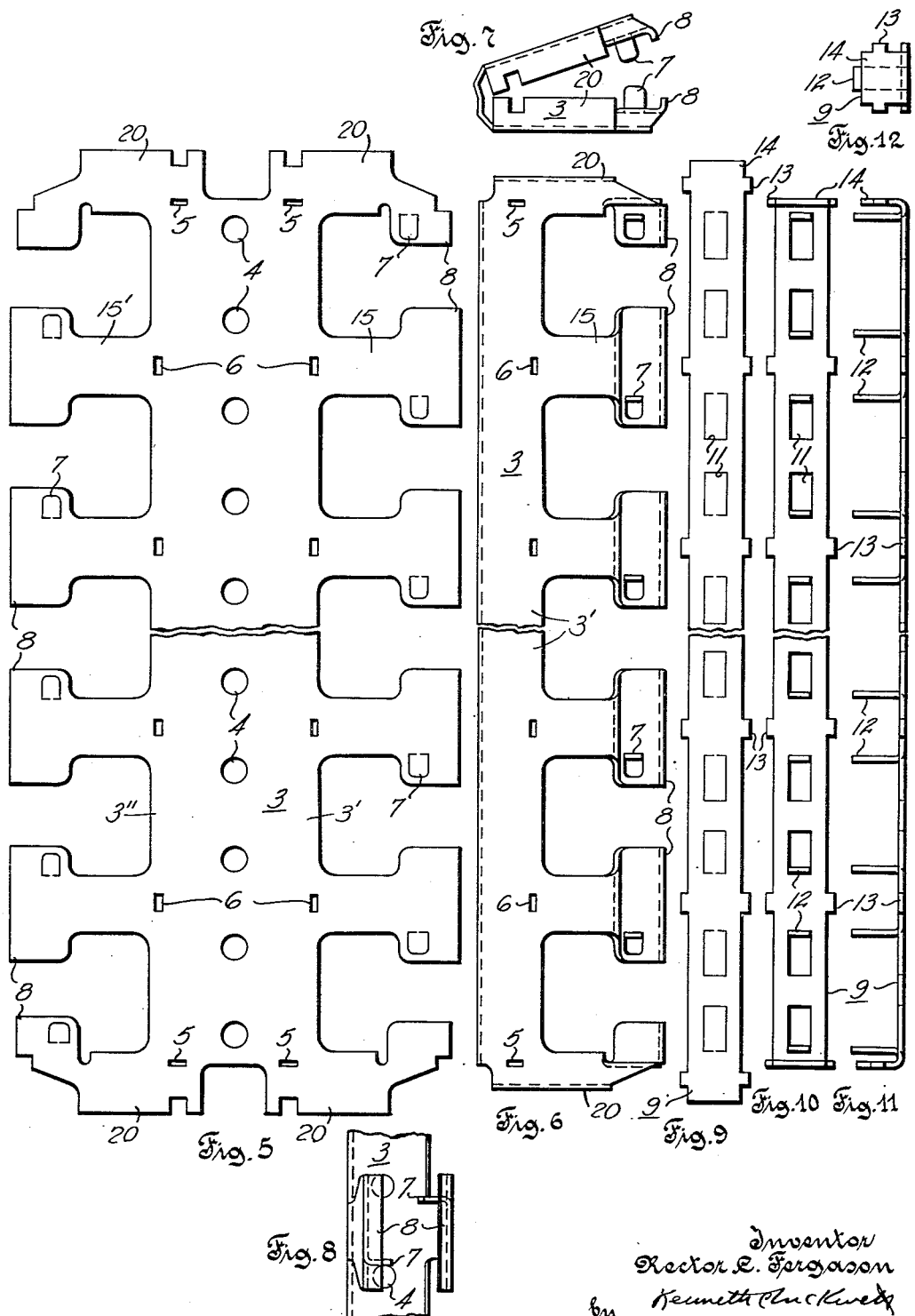

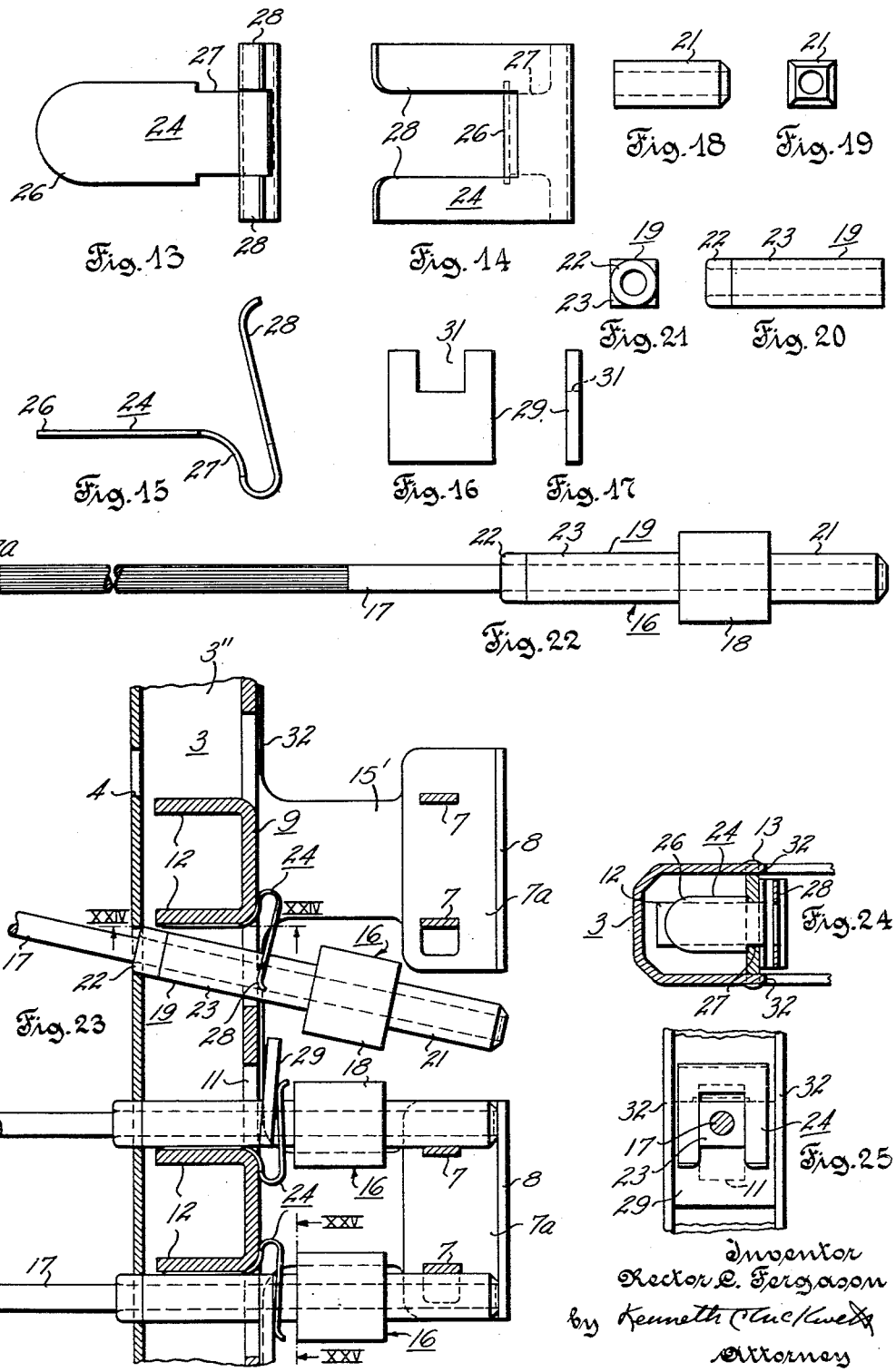

United States Patent Office 2,705,860
Patented Apr. 12, 1955

2,705,860

COTTON PICKER SLAT

Rector C. Fergason, Gadsden, Ala., assignor to Allis-Chalmers Manufacturing Company, Milwaukee, Wis.

Application March 18, 1952, Serial No. 277,147

22 Claims. (Cl. 56—42)

This invention is concerned with a new and improved type of cotton picker spindle slat construction suitable for use in a machine of the type disclosed in U. S. Patent 2,440,450, issued April 27, 1948, to John D. Rust, for Spindle Slats for Cotton Harvesters.

In general, the slat constructions heretofore employed have been such that the replacement of a single spindle element requires considerable time and effort on the part of the operator. As a result, machines having worn or damaged spindle elements are often continued in operation for considerable periods of time. This is objectionable as the picking efficiency of spindle type machines decreases materially as the spindle elements thereof become worn or damaged. In addition, the continued operation of a machine in this condition usually results in far more extensive repairs than would be necessary had there been a timely replacement of the worn or damaged parts.

Therefore, the present invention is directed toward and has as an object the provision of an improved slat construction affording the ready removal and replacement of worn or damaged spindle elements.

Another object of the present invention is the provision of an extremely durable spindle carrying slat construction embodying parts combined for coaction in an improved manner affording ready removal and replacement of a single spindle element without the use of special tools.

Another object of this invention is to provide a simplified spindle slat construction wherein each spindle is journaled in bearings on each side of its spindle drive roller and wherein individual spindles can be readily removed from the slat without disassembling the entire slat.

Another object of this invention is to provide a simplified spindle slat construction composed of few parts which can be readily assembled and disassembled.

Another object of this invention is to provide a simplified spindle slat construction which can be manufactured economically.

Another object of this invention is to provide a strong slat of simple design which slat supports spindles journaled on each side of their drive rollers.

Another object of this invention is to provide a spindle carrying slat of few parts wherein the component parts of said slat may be readily removed without the use of special tools.

Another object of this invention is to provide an improved spindle slat hinge which permits ready removal of the slat from a picking unit without the use of special tools.

Another object of this invention is to provide a new method of constructing a spindle slat.

These and other objects of invention will be apparent to those skilled in the art to which this invention relates from the following description, taken in connection with the accompanying drawings.

In the drawings:

Fig. 1 illustrates a side view of a spindle slat structure with parts broken away and shown in section to show how the locking plates or wear strips force the spindle assembly against supports forming a part of the slat, the surface through which the spindles project being termed the front of the structure;

Fig. 2 is a front view of the slat assembly shown in Fig. 1;

Fig. 3 is a rear view of the slat assembly shown in Fig. 1 with parts broken away and shown in section;

Fig. 4 is a section taken along the line IV—IV of Fig. 1;

Fig. 5 shows a sheet metal stamping from which part of the slat assembly shown in Fig. 1 is formed;

Fig. 6 is a side view of the part formed from the stamping shown in Fig. 5;

Fig. 7 is an end view of the part shown in Fig. 6;

Fig. 8 is a fragmentary rear view of the part shown in Fig. 7;

Fig. 9 shows a sheet metal stamping from which a stiffener of the slat assembly shown in Fig. 1 is formed;

Fig. 10 is a rear view of the stiffener formed from the stamping shown in Fig. 9;

Fig. 11 is a side view of the stiffener shown in Fig. 10;

Fig. 12 is an end view of the stiffener shown in Fig. 11;

Figs. 13, 14 and 15 are enlarged plan, elevational and side views, respectively, of the spring for locking the bearings;

Figs. 16 and 17 are rear and side enlarged elevational views, respectively, of the locking plate or wear strip;

Figs. 18 and 19 are side and rear enlarged elevational views, respectively, of the rear bearing;

Figs. 20 and 21 are side and rear enlarged elevational views, respectively, of the front bearing;

Fig. 22 is an enlarged side elevational view of a spindle and bearing assembly;

Fig. 23 is an enlarged sectional side view of part of the spindle slat structure in partly assembled condition, the section being taken generally along the plane indicated by line XXIII—XXIII of Fig. 4;

Fig. 24 shows the anchoring of the spring against the stiffener, the section being taken along the line XXIV—XXIV of Fig. 23;

Fig. 25 is a fragmentary section taken along the line XXV—XXV of Fig. 23 to show the relation and cooperation of parts which constitute the locking arrangement of the spindle assembly;

Fig. 26 is a side view of a spring clip used in a modified slat structure;

Fig. 27 is a plan view of the spring clip shown in Fig. 26;

Fig. 28 is a fragmentary side view of a modified slat structure and improved slat hinge with some parts broken away and shown in section;

Fig. 29 is an enlarged sectional view on line XXIX—XXIX of Fig. 28;

Fig. 30 is a front elevation of part of the slat and hinge shown in Fig. 28.

Referring particularly to Fig. 1, it is seen that an elongated hollow cotton picker spindle carrying slat structure 1 has been provided which is attached to hinge structures 2 in the manner shown in the hereinabove mentioned Rust patent, and which hinge structures are adapted to be attached to conveyor chains (not shown) in the same manner as shown in said patent.

Referring now to Figs. 5 through 12, the manner of manufacturing the slat structure 1 will be described. A piece of sheet metal is stamped or otherwise formed to provide an elongated slat element or member 3 having similar opposite sides including peninsular portions 15, 15' symmetrically projecting from the longitudinal central portion thereof to provide a configuration such as is shown in Fig. 5. The central portion or outer wall of element 3 is provided with a series of longitudinally spaced circular holes 4, with a pair of rectangular holes 5 at each end thereof, and with a series of longitudinally spaced rectangular holes 6 provided at transversely spaced intervals. In addition, peninsular portions 15, 15' are each provided with a series of inwardly turned tab portions 7. After the slat element has been thus formed, the slotted opposite ends 20 thereof and the outer or free ends 8 of the oppositely projecting peninsular portions are similarly bent at right angles to the plane of the slat element shown in Fig. 5 whereupon the oppositely projecting side portions are bent over relative to each other and relative to the central portion thereof, generally to the extent indicated in Fig. 7.

The next step is the insertion of an intermediate wall or reinforcing strip 9 which may be stamped or otherwise formed from sheet metal to provide the initial configuration shown in Fig. 9. This strip is provided with a longitudinally extending series of spaced rectangular apertures 11 therein which are formed by portions or wall segments 12 being struck out and bent over at a right angle to the plane of the strip, and extend transversely thereof in adjacent relation to openings 11. That is, wall segments 12 extend from said intermediate wall 9 toward said outer wall in extension forming relation to one side of each of the apertures in said intermediate wall. In addition, the side edges of the strip are provided with a series of transversely aligned, oppositely projecting tabs 13. After the stiffening member has been formed as just described the opposite end portions 14 thereof, each of which includes a pair of tabs 13, are turned at a right angle as is indicated in Figs. 10, 11 and 12, that is right angle portions 14 extend generally transverse to the longitudinal axis of slat member 3 and when installed therein portions 14 are in transverse alignment with the ends of the central portion as best shown in Fig. 1.

In this connection, it is to be noted that the length of bent over portions 12 and the shape and arrangement of tabs 13 are such that when the stiffening member 9 is properly inserted into the slat element shown in Figs. 6, 7 and 8, the tabs 13, on bent over portions 14, are in alignment with the holes 5, the intermediate tabs 13 are in alignment with the openings 6, and the free ends of portions 12 are spaced from the inner surface of the central portion of the element. The assembling procedure is then continued until tabs 13 extend through the holes 5 and 6 whereupon the outer ends of these tabs are then peened over or otherwise fastened to form a rigid connection between stiffening member 9 and slat element 3. Turned over end portions 8 are now in contiguous abutting relation and are welded or otherwise fixedly joined together as indicated in Figs. 1, 3 and 4 to form a longitudinal series of inner wall sections generally parallel to the central portion now bridging the side portions or walls 3' and 3".

When thus assembled, it is to be noted that the openings 11 in the stiffening member or reinforcing strip 9 conform in number and are aligned with the circular holes or apertures 4 in the central portion of slat member 3. Also it will be seen that the free ends of the tabs 7 on the opposed peninsular portions 15, 15' (note the tabs are longitudinally staggered as seen in Fig. 5) now abut the inner surface of the opposite portion and are in general alignment with the bent over portions 12 of strip 9. In addition, it will be apparent that the thus assembled slat is an elongated (hollow) member presenting an outer wall having a series of longitudinally spaced openings or apertures 4 therethrough, similar side walls or portions 3' and 3", a series of inner wall sections (formed by uniting turned over portions 8), and an intermediate wall (stiffening member or reinforcing strip 9). The bent over portions 12 on member 9 and the tabs 7 on peninsular portions 15, 15' constitute transverse wall segments and elements, respectively; parts of said slat member including said wall elements and inner wall sections coacting to form a series of longitudinally spaced multi-sided bearing receiving receptacles disposed in transverse alignment with the registering apertures in the outer and intermediate walls.

Further, it will be noted that the side walls 3' and 3" extend longitudinally beyond the ends of the central portion or outer wall, beyond the corresponding ends of the adjacent inner wall sections, and that the terminal ends of these side walls have right angle portions 20 (Fig. 7) inturned toward each other to form an end wall which is disposed in longitudinally spaced relation to the proximate ends of the outer wall and of the inner wall sections thereby defining an open ended passage at each end of the slat structure which extends transversely therethrough. It will be understood that while portions 20 terminate in abutting relation with each other they may extend into overlapping relation with each other as is shown by end portions 41 and 42 (Fig. 30) of a modified slat structure which will be more fully described hereinbelow.

Spindle assemblies 16 which may be individually inserted or removed from the slat structure 1 are shown in Fig. 22, and details of the bearing elements thereof are shown in Figs. 18–21. This spindle assembly consists of an elongated wire spindle rod 17 having an enlarged drive portion 18 positioned intermediate the ends thereof and outer and inner bearing members 19 and 21, respectively, which are insertable over opposite ends of the spindle. Inner bearing member 21 is square in cross section and has a circular hole passing through the length thereof substantially equal in diameter to the diameter of the spindle. Outer bearing member 19 has an outer end portion 22 of cylindrical configuration (see Figs. 20 and 21) and has a circular hole which extends the length of bearing member 19 and is substantially equal in diameter to the spindle. The inner end portion 23 of outer bearing 19 has a square configuration wherein the sides are equal to the diameter of cylindrical portion 22 on the forward end thereof.

Spindle assembly 16 is inserted into slat structure 1 in the following manner. Referring to Figs. 13, 14, 15, 23 and 24, it will be seen that a spring element 24, which consists of a tab portion 26 of greater width than the short dimension of rectangular apertures 11, a neck portion 27 of equal width to the short dimension of rectangular apertures 11 and a bifurcated portion presenting a pair of legs 28 extending generally at a right angle to tab portion 26, is inserted into a rectangular aperture 11 with one surface of tab portion 26 extending parallel to the larger side of said aperture. The spring element is then rotated 90° until the tab surface portion is resting against bent over portion or wall segment 12 in the position shown in Fig. 23 and neck portion 27 is engaging the adjacent opposite edge portions of the longer sides of aperture 11. Next, the spindle assembly 16 is positioned at an angle and moved toward the aperture 11 in reinforcing strip 9 and the aligned aperture 4 in slat element 3 as shown in Fig. 23, the picking end 17A of the spindle first passing between legs 28, through one of the rectangular apertures 11 and through a transversely registering hole 4, this movement continuing until the cylindrical forward portion 22 of bearing 19 enters hole 4. It is to be here noted that hole 4 is of such diameter as to receive cylindrical spindle bearing portion 22 but is too small to receive rectangular spindle bearing portion 23, thereby limiting the extent to which the spindle assembly can be inserted into slat structure 1. The spindle assembly is then pivoted about cylindrical portion 22 in an upwardly direction as shown in Fig. 23 until spindle bearing member 21 is received in the receptacle 7A formed by the transverse wall element, tab or turned over portion 7, the inner sides of peninsular portions 15 and 15' and the inner wall sections formed by the joining of turned over portions 8 (note Fig. 4). A wear strip or locking member 29 (see Figs. 16, 17 and 23) has a square portion cut out of one end thereof to provide an opening 31 complementary to the square cross sectional configuration of the inner portion 23 of bearing 19, this locking member being slid longitudinally under spring legs 28 until the edges defining opening 31 are in contiguous encompassing relation with three sides of bearing portion 23. It will be noted that a longitudinal side surface of outer bearing 19 is slidably contiguous to transverse wall segment 12. That is, as the spindle assembly is inserted the bearing 19 slidably engages the exposed surface of the spring tab portion 26 which in turn abuts a wall segment 12. After installation one side of the square inner portion of bearing 19 is in complete face to face engagement with spring tab 26 which together with wall segment 12 prevents rotation of bearing 19. Inner bearing 21 also nonrotatably engages a bearing tab or wall element 7 between the intermediate wall or reinforcing strip 9 and the inner opposed wall section formed by end portions 8. Also, it should be noted that the side edges of the locking member or wear strip are in engagement with the inner side surfaces 32 of element 3 thus preventing a relative side movement of the wear strip. At this time the opposite end of the wear strip member (as viewed in Fig. 1) will be disposed for edge opposed abutting engagement with the corresponding end of the next adjacent wear strip member whereupon insertion of the next adjacent spindle assembly and wear strip results in their being securely removably retained against longitudinal movement.

Again referring to Fig. 23, it is seen that turned over portions 7 and 12 coact with bearing portions 21 and 23, respectively, to limit movement of spindle assembly 16 in one direction longitudinally of the slat structure. Wear strip member 29 prevents movement of the spindle assembly in the opposite direction as does also the coaction between cylindrical bearing portion 22 and the surrounding edge of circular apertures 4 which is of substantially the same size as bearing portion 22. In addition, movement of the outer bearing members 19 to the left as viewed in Figs. 1, 4 and 23 is prevented because, as previously indicated, the square cross section portion 23 of bearing members 19 cannot pass through the circular hole 4. Furthermore, movement of the spindle assembly in the opposite direction, that is toward the right, is prevented by the outer end of bearing 21 engaging the turned over end portions 8 of the slat structure.

As the spindles in a cotton picking machine are the active elements engaging the cotton plants, these are the elements which are most likely to become worn or damaged sufficiently to require replacement. From the construction already described it is seen that the individual spindle can readily be inserted into a slat. It is equally easy to remove a spindle if it should become necessary or desirable to do so, removal being effected by reversing the steps previously described for inserting a spindle. More specifically, these steps are as follows: Remove the slat structure 1 from the hinges 2, and then with the use of a tool such as a screwdriver, knife, or the like, move the end of wear strip member 29 (which abuts the corresponding end of the adjacent wear strip member) away from stiffening member 9 and against the biasing action of spring legs 28 until it clears the abutting wear strip member. The thus cleared wear strip member is next removed from the slat by shifting the strip longitudinally of the slat away from the bearing 19 it is contacting and from under the spring legs 28. When this is done the spindle assembly 16 is pivoted longitudinally about cylindrical portion 22 until spindle bearing member 21 moves out of the receptacle or bearing support 7A formed in slat structure 1 by the sides thereof and turned over portions 7 and 8 and the spindle assembly is positioned as shown in the upper portion of Fig. 23 whereupon the spindle assembly can then be withdrawn from the slat simply by moving the assembly to the right along a line generally coinciding with its major axis.

Figs. 26 through 30 show a modified type of slat construction, wherein slat structure 33 is constructed in much the same manner as has already been described for slat structure 1. That is, slat structure 33 is formed out of sheet material with the same apertures 4, 5 and 6 therein. However, the peninsular portions of slat structure 33 are provided with square shaped apertures or ports 34. It will be understood that the modified slat is not provided with inturned bearing tab portions or wall elements 7, or inturned end portions 8. The peninsular portions 15 and 15' of modified slat 33 terminate in free standing ends which are rigidly connected together by a clip element 51 as will be more fully explained hereinbelow. In addition, slat structure 33 is provided with a stiffening element or reinforcing strip 36 which differs from stiffening element 9 in that the opposite terminal ends of reinforcing strip 36 are provided with first offset portions 43 extending toward the adjacent end of said outer central or wall portion, the first offset portion having a second offset portion 37 extending at right angles thereto and toward the end wall formed by end portions 41 and 42 and in generally parallel relation to the outer central portion. It will be noted that the second offset portion 37 is provided with rectangularly shaped apertures 39 (see Fig. 30). This stiffening member 36 is inserted in slat structure 33 after the sides of the slat structure have been partially bent back on themselves in the same manner as has been described for slat element 3. The end portions 41 and 42 of slat structure 33 are so constructed that in the bending process they will overlap each other as is indicated in Figs. 28 and 30. These overlapping end portions 41 and 42, which are rigidly united as by welding (not shown), are spaced in generally parallel relation from the stiffener end portion 43 to form therewith a passage 44 aligned with the rectangular aperture 39 in terminal portion 37. Passage 44, there being one at each end of slat structure 33, is adapted to receive one leg 45 of a slat hinge 46. The other leg 47 of slat hinge 46 is provided with an aperture 50 which is adapted to pivotally receive a pin attached to a conveyer chain (not shown). That is, the legs extend in spaced generally parallel relation to each other, their ends being joined together by a U-shaped portion. Leg 45 of slat hinge 46 is snugly received in passage 44 between turned over portion or end wall 41 and transversely extending first offset portion 43 of stiffening member 36. Leg 45 is provided with a shouldered configuration formed by a reduced end portion 48 which is snugly received within rectangular aperture 39 in the terminal end portion 37 of stiffening member 36. A pair of opposite sides of this reduced end portion 48 of leg 45 are threaded to receive a lock nut 49. From Figs. 28 and 30 it is seen that slat 33 is readily removable from hinge members 46 merely by removing nuts 49 and moving slat member 33 to the left as shown in Fig. 28 and continuing movement in that direction until the slat has been slid from leg 45 of hinge 46.

Referring also to Figs. 26, 27, 28 and 29, it is seen that slat structure 33 embodies a clip element 51 which provides a rigid attachment between the free ends of the peninsular portions. The clip element 51 comprises a pair of spaced wings 52 extending parallel to each other, key portions 53 partially stamped out of each wing, a web 54 rigidly connecting the ends of wings 52, and a bearing tab portion 56 extending from the web 54 at right angles thereto with wings 52 in flanking relation to tab 56. The key portions are adapted to fit snugly in the ports 34 in the slat structure 3. It will be understood that the modified slat does not have bearing tabs 7, their function being provided for by the bearing tabs 56 of clip 51. The end 54 has a portion 56 bent over to extend in generally parallel spaced relation between the sides 52. When the clip is positioned on the slat as just described the bent over portion 56 provides a surface which is engaged by the side portion of rear spindle bearing member 21.

Slat structure 33 is provided with individual spindle assemblies 16 which are inserted and removed from slat element 33 in exactly the same manner as has already been described for slat element 3 and it is believed unnecessary to repeat a description of such process.

It will be noted that each slat element 33 (see Figs. 28 and 30) has a semicircular piece 57 removed from mid-end portions thereof in the stamping process. This removed portion makes nuts 49 readily accessible to be easily removed or installed by use of a socket wrench.

In view of the foregoing description, the slat structure 1 may be considered as comprising a hollow elongated structure having generally parallel and substantially coextensive outer and inner walls (the outer wall being that surface which presents holes or apertures 4 shown in Fig. 2 and the inner wall is the end portions 8 of the peninsular portions or the clip element 51 of the modified slat). These walls extend longitudinally of the structure and are permanently united with side walls which present longitudinally spaced pairs of complementary peninsular portions which project inwardly beyond reinforcing strip 9 and form with turned over portions 8 thereof a series of compartments disposed in spaced open ended alignment longitudinally of said structure. The outer wall and reinforcing strip each have a similar series of apertures extending therethrough in spaced generally aligned relation longitudinally of slat structure 1. The apertures 4 in the outer wall being of circular configuration while the apertures 11 in the reinforcing strip are oblong in configuration and positioned in the portions of strip 9 which are exposed between the aforementioned inwardly projecting peninsular portions which have their inner portions 8 turned over and joined.

It is believed that this description has recited a slat hinge 46 and a slat 33 of such simple design that it can be removed from the hinges by simply removing two readily available nuts and then pulling the slat off of the hinge legs.

It is believed that both embodiments of slat elements shown, provide advantages not found in the prior art including a slat structure wherein the spindle assemblies can be individually removed without disassembling the entire slat and wherein such process can be done without the use of special tools.

It is to be understood that it is not desired to limit the invention to the particular features and details described hereinabove and that the invention is to be considered as including such other forms and modifications as are fairly embraced within the scope of the appended claims.

It is claimed and desired to secure by Letters Patent:

1. Means for connecting a normally vertically extending cotton picking spindle carrying slat to conveyer chains, said slat having a normally horizontally extending passage at each end and a reinforcing strip extending the length of said slat and extending into said passages transversely thereto, the portions of said strip extending into said passages each being provided with an aperture of a size smaller than said passage, said means including hinge elements, each hinge element including a pair of legs extending in spaced generally parallel relation to each other, one end of each being joined to form a generally U-shaped member, one of said legs having means affording a pivotal connection with a slat carrying chain, the other of said legs being shaped to snugly enter said slat passage and having a terminal end portion dimensioned to snugly pass through said aperture, and means coacting with said reinforcing element and the reduced end portion of said hinge for retaining said hinge portion in said slat passage.

2. For use in a cotton picking slat constructed to provide a multisided spindle bearing supporting receptacle and an aperture in alignment with said receptacle, the improvement comprising a cotton picking spindle assembly including a rod element having an enlarged drive portion intermediate its ends and outer and inner bearings individually removably mounted about said rod element, adjacent respectively, the outer and inner ends of said drive portion, said inner bearing having an exterior configuration conforming with the multisided slat receptacle said outer bearing being provided with a reduced outer end portion insertable into said slat aperture and having a rear portion of larger size than said aperture, and means adapted to be carried by said slat for retaining said spindle assembly in said slat with said rear bearing being retained in said bearing support and the forward portion of said front bearing being received within said aperture.

3. For use in a cotton picking machine embodying spindle carrying slats having their opposite ends hingedly mounted on slat supporting chains, a combined slat and hinge structure comprising: an elongated hollow slat member having an outer wall provided with a series of longitudinally spaced spindle receiving apertures extending therethrough and having side walls presenting terminal end portions which extend beyond the opposite ends of said outer wall and coact therewith to form an open ended passage at each end of said slat member, which extends therethrough generally at a right angle to said outer wall; a reinforcing strip fixedly disposed between said side walls in spaced generally parallel relation to said outer wall, said strip having apertures therethrough aligned with the apertures in said outer wall and presenting an apertured opposite terminal end portion disposed in each passage in generally parallel relation to said outer wall; a hinge element including a flat plate having means affording pivotal connection with a slat carrying chain and a turned over portion which extends into said passage and terminates in a reduced end portion passing snugly through the aperture in the associated terminal end of said strip; and means coacting with said terminal end and the reduced end of said turned over portion for detachably securing said hinge element to said slat.

4. For use in a cotton picking machine embodying spindle carrying slats having their opposite ends hingedly mounted on slat supporting chains, a combined slat and hinge structure comprising: an elongated hollow slat member having an outer wall permanently bridging generally parallel side walls terminating in opposite end portions extending beyond the adjacent end of the outer wall and united to form an end wall spaced from the proximate end of said outer wall, said outer wall having a series of longitudinally spaced spindle receiving apertures extending therethrough; a reinforcing strip fixedly disposed between said side walls in spaced generally parallel relation to said outer wall, said strip having apertures therethrough aligned with the apertures in said outer wall and presenting terminal ends each having a first offset portion extending toward the adjacent end of said outer wall in generally parallel passage forming relation to said end wall and a second offset portion extending toward said end wall in generally parallel relation to said outer wall, said second offset portion having an aperture therethrough; a hinge element including a flat plate having means affording pivotal connection with a slat carrying chain and a turned over portion disposed between said first offset portion and the associated end wall, said turned over portion having a reduced terminal end passing snugly through said aperture in said second offset portion; and means coacting with said second offset portion and the reduced end of said turned over portion for detachably securing said hinge element to said slat.

5. For use in a cotton picking machine embodying spindle carrying slats having their opposite ends hingedly mounted on slat supporting chains, a combined slat and hinge structure comprising: an elongated hollow slat member having an outer wall permanently bridging generally parallel side walls terminating in opposite end portions each extending beyond the adjacent end of said outer wall and united to form an end wall spaced from the proximate end of said outer wall, said outer wall having a series of longitudinally spaced spindle receiving apertures extending therethrough and said side walls presenting longitudinally spaced pairs of complementary peninsular portions coacting to form a series of oppositely facing pairs of compartments disposed in open ended alignment longitudinally of said structure and in approximate transverse alignment with pairs of the apertures in said outer wall; a reinforcing strip fixedly disposed between said side walls in spaced generally parallel relation to said outer wall, said strip having apertures therethrough in alignment with the apertures in said outer wall and presenting terminal ends each having a first offset portion extending toward the adjacent end of said outer wall in generally parallel passage forming relation to said end wall and a second offset portion extending toward said end wall in generally parallel relation to said outer wall, said second offset portion having an aperture therethrough; a hinge element including a flat plate having means affording pivotal connection with a slat carrying chain and a turned over portion disposed between said first offset portion and the associated end wall, said turned over portion having a reduced terminal end passing snugly through the aperture in said second offset portion; and means coacting with said second offset portion and the reduced end of said turned over portion for detachably securing said hinge element to said slat.

6. For use in a cotton picking machine embodying spindle carrying slats having their opposite ends hingedly mounted on slat supporting chains, a combined slat and hinge structure comprising: an elongated hollow slat member having an outer wall permanently bridging generally parallel side walls terminating in opposite end portions extending beyond the adjacent end of the outer wall and united to form an end wall spaced from the proximate end of said outer wall, said outer wall having a series of longitudinally spaced spindle receiving apertures extending therethrough; a reinforcing strip fixedly disposed between said side walls in spaced generally parallel relation to said outer wall, said strip having apertures therethrough aligned with the apertures in said outer wall and presenting apertured terminal ends extending from said outer wall toward said end wall in generally parallel relation to said outer wall; a hinge element including a flat plate having means affording pivotal connection with a slat carrying chain and a turned over portion extending alongside the inner surface of said end wall and terminating in a reduced end passing snugly through the aperture in said terminal end of said strip; and means coacting with said terminal end of said strip and the reduced end of said turned over portion for detachably securing said hinge element to said slat.

7. For use in a cotton picking machine embodying spindle carrying slats having their opposite ends hingedly mounted on slat supporting chains, an improved slat structure comprising: an elongated hollow slat member having an outer wall permanently bridging generally parallel side walls terminating in opposite end portions extending beyond the adjacent end of the outer wall and united to form an end wall spaced from the proximate end of said outer wall, said outer wall having a series of longitudinally spaced spindle receiving apertures extending therethrough; and a reinforcing strip permanently disposed between said side walls in spaced generally parallel relation to said outer wall, said strip having apertures therethrough aligned with the apertures in said outer wall and presenting terminal ends each having a first offset portion extending toward the adjacent end of said outer wall in generally parallel passage forming relation to said end wall and a second offset portion extending toward said end wall in generally parallel relation to said outer wall, said second offset portion having an aperture therethrough.

8. For use in a cotton picking machine embodying spindle carrying slats having their opposite ends hingedly mounted on slat supporting chains, an improved slat structure comprising: an elongated hollow slat member having an outer wall permanently bridging generally parallel side walls terminating in opposite end portions extending beyond the adjacent end of the outer wall and united to form an end wall spaced from the proximate end of said outer wall, said outer wall having a series of longitudinally spaced spindle receiving apertures extending therethrough and said side walls presenting longitudinally spaced pairs of complementary opposed peninsular portions coacting to form a series of oppositely facing pairs of compartments disposed in open ended alignment longitudinally of said structure and in approximate transverse alignment with pairs of the apertures in said outer wall; and a reinforcing strip permanently disposed between said side walls in spaced generally parallel relation to said outer wall, said strip having apertures therethrough in alignment with the apertures in said outer wall and presenting terminal ends each having a first offset portion extending toward the adjacent end of said outer wall in generally parallel passage forming relation to said end wall and a second offset portion extending toward said end wall in generally parallel relation to said outer wall, said second offset portion having an aperture therethrough in alignment with the passage between said end wall and said first offset portion of said strip.

9. For use in a cotton picking machine utilizing hingedly mounted spindle carrying slats, an improved slat and spindle structure affording independent removal and insertion of individual spindle assemblies, said structure comprising: an elongated slat member presenting an outer wall, a series of inner wall sections spaced apart and aligned longitudinally of said member in generally parallel relation to said outer wall, and an intermediate wall coextensive with and generally parallel to said outer wall, said outer wall having a series of longitudinally spaced apertures therethrough in transverse opposite relation to said inner wall sections, said intermediate wall including a series of longitudinally spaced apertures therethrough disposed in transverse registry with and being larger than the apertures in said outer wall; a rigid transverse wall segment extending from said intermediate wall toward said outer wall in extension forming relation to one side of each of the apertures in said intermediate wall; a series of longitudinally spaced wall elements conforming in number to said transverse wall segments and projecting transversely from said slat member between said intermediate wall and said inner wall sections in adjacent relation to the latter, said wall elements being arranged in transverse planes each including the surface of one of said transverse wall segments which forms a side of an aperture in said intermediate wall; parts of said slat member including said inner wall sections and wall elements presenting surfaces coacting to form a series of longitudinally spaced multisided bearing receiving receptacles disposed in transverse alignment with the registering apertures in said outer and intermediate walls; a spindle assembly comprising a rod element having an enlarged drive portion thereon in spaced adjacent relation to one end of said rod, an outer bearing member rotatably enclosing a portion of said rod element in adjacent relation to the side of said drive portion facing the other end of said rod element, said outer bearing member presenting a reduced end portion remote from said enlarged drive portion dimensioned for insertion through an aperture in said outer wall, an inner bearing member rotatably enclosing the portion of said rod element between said enlarged drive portion and said one end of said element, said spindle assembly being supported in said elongated member with said inner bearing nonrotatably slidably disposed in said receptacle and said outer bearing member having its reduced end portion rotatably slidably disposed in an aperture in said outer wall aligned with said receptacle and its inner portion nonrotatably transversely slidably disposed within the aperture in said intermediate wall which is aligned with the aperture in said outer wall receiving the reduced end portion of said outer bearing; and removable means for retaining said spindle assembly in said elongated member including a wear strip having a configuration at one end thereof complementary to said inner portion of said outer bearing, said wear strip being positioned with the configured end thereof contacting said inner portion of said outer bearing and the opposite end thereof disposed in abutting relation to an opposite end of an adjoining wear strip, said wear strip being transversely biased against said intermediate wall thereby preventing movement of said spindle assembly longitudinally relative to said elongated member.

10. For use in a cotton picking machine utilizing hingedly mounted spindle carrying slats, an improved slat and spindle structure affording independent removal and insertion of individual spindle assemblies, said structure comprising: an elongated slat member presenting an outer wall, a series of inner wall sections spaced apart and aligned longitudinally of said member in generally parallel relation to said outer wall, and an intermediate wall coextensive with and generally parallel to said outer wall, said outer wall having a series of longitudinally spaced apertures therethrough in transverse opposite relation to said inner wall sections, said intermediate wall including a series of longitudinally spaced apertures therethrough in transverse registry with and being larger than the apertures in said outer wall; and said inner wall sections presenting adjacent surfaces coacting to form a series of longitudinally spaced multisided bearing receiving receptacles disposed in transverse alignment with the registering apertures in said outer and intermediate walls; transversely extending spindle assemblies operatively supported in said slat member, said spindle assemblies each comprising a rod element having an enlarged drive portion thereon in spaced adjacent relation to one end of said rod, an outer bearing member rotatably enclosing a portion of said rod element in adjacent relation to the side of said drive portion facing the other end of said rod element, said outer bearing member presenting a reduced end portion remote from said enlarged drive portion dimensioned for insertion through an aperture in said outer wall, and an inner bearing member rotatably enclosing the portion of said rod element between said enlarged drive portion thereon and said one end thereof, said spindle assemblies each being supported in said elongated member with its inner bearing nonrotatably slidably disposed in said receptacle and its outer bearing member nonrotatably transversely slidably disposed within the aligned one of said apertures in said intermediate wall with said reduced end portion rotatably slidably disposed in the registering one of said apertures in said outer wall; and removable spindle assembly retaining means carried by said elongated member and engaging a nonrotating part of said assembly.

11. For use in a cotton picking machine utilizing hingedly mounted spindle carrying slats, an improved slat structure affording independent removal and insertion of individual spindle assemblies, said structure comprising an elongated slat member presenting an outer wall, a series of inner wall sections spaced apart and aligned longitudinally of said member in generally parallel relation to said outer wall, and an intermediate wall coextensive with and generally parallel to said outer wall, said outer wall having a series of longitudinally spaced apertures therethrough in transverse opposite relation to said inner wall sections, said intermediate wall including a series of longitudinally spaced apertures therethrough disposed in transverse registry with and being larger than the apertures in said outer wall, a rigid transverse wall segment extending from said intermediate wall toward said outer wall in extension forming relation to one side of each of the apertures in said intermediate wall, and a series of longitudinally spaced wall elements conforming in number to said transverse wall segments and projecting transversely from said slat member between said intermediate wall and said inner wall sections in adjacent relation to the latter, said wall elements being arranged in transverse planes each including a surface of one of said transverse wall segments, said slat member, inner wall sections and wall elements presenting surfaces coacting to form a series of longitudinally spaced multisided bearing receiving receptacles disposed in transverse alignment with the registering apertures in said outer and intermediate walls.

12. For use in a cotton picking machine utilizing hingedly mounted spindle carrying slats, an improved slat structure affording independent removal and insertion of individual spindle assemblies, said structure comprising an elongated slat member presenting an outer wall, a series of longitudinally spaced and aligned inner wall sections, and an intermediate wall coextensive with and generally parallel to said outer wall, said outer wall having a series of longitudinally spaced apertures therethrough in transverse opposite relation to said inner wall sections, said intermediate wall including a series of longitudinally spaced apertures therethrough disposed in transverse registry with and being larger than the apertures in said outer wall, and a series of longitudinally spaced wall elements conforming in number to the apertures in said outer wall and projecting transversely from said slat member between said intermediate wall and said inner wall sections in adjacent relation to the latter, parts of said slat member including said inner wall sections and wall elements presenting surfaces coacting to form a series of longitudinally spaced multisided bearing receiving receptacles disposed in transverse alignment with the registering apertures in said outer and intermediate walls.

13. In combination in an elongated slat member having an outer wall provided with a series of apertures therethrough spaced apart and aligned longitudinally of said member, and a series of transverse inner wall elements spaced apart longitudinally of said member in approximate transverse alignment with said apertures, a picking spindle assembly including a rod element insertable at an angle through one of said apertures and provided with an enlarged drive portion and with outer and inner bearings mounted about portions of said rod element, respectively, adjacent the outer and inner ends of said drive portion, said outer bearing having a reduced end portion seatably receivable in said aperture to limit the movement of said spindle outwardly therethrough and to afford pivotal movement of said assembly longitudinally of said slat sufficient to position said inner bearing against the inner wall element aligned with said aperture, and removable retaining means coacting with said outer bearing and parts of said slat member for retaining said spindle assembly rotatably mounted therein.

14. In combination in an elongated slat member having an outer wall provided with a series of longitudinally spaced apertures therethrough, a series of transverse inner wall elements spaced apart longitudinally of said member in approximate transverse alignment with the apertures in said outer wall, and an intermediate wall coextensive with and generally parallel to said outer wall, said intermediate wall including a series of longitudinally spaced apertures therethrough in transverse registry with and being of a larger size than the apertures in said outer wall, a picking spindle assembly including a rod element insertable at an angle through a registering pair of said apertures and provided with an enlarged drive portion and with outer and inner bearings mounted about portions of said rod element respectively adjacent the outer and inner ends of said drive portion, said outer bearing having a reduced end portion seatably receivable in said aperture in said outer wall to limit the movement of said spindle outwardly therethrough and to afford pivotal movement of said assembly longitudinally of said slat sufficient to position said inner bearing against the inner wall element aligned with said aperture, and removable resiliently held retaining means coacting with said outer bearing and parts of said slat member for retaining said spindle assembly rotatably mounted therein.

15. In combination in an elongated slat member having an outer wall provided with a series of longitudinally spaced apertures therethrough, a series of transverse inner wall elements spaced apart longitudinally of said member in approximate transverse alignment with the apertures in said outer wall, and an intermediate wall coextensive with and generally parallel to said outer wall, said intermediate wall including a series of longitudinally spaced apertures therethrough in transverse registry with and being of a larger size than the apertures in said outer wall, a picking spindle assembly including a rod element insertable at an angle through a registering pair of said apertures and provided with an enlarged drive portion and with outer and inner bearings mounted about portions of said rod element, respectively, adjacent the outer and inner ends of said drive portion, said outer bearing having a reduced end portion seatably receivable in said aperture in said outer wall to limit the movement of said spindle outwardly therethrough and to afford pivotal movement of said assembly longitudinally of said slat sufficient to position said inner bearing against the inner wall element aligned with said aperture, and removable resiliently held retaining means including a wear strip coacting with said bearing and parts of said slat member for retaining said spindle assembly rotatably mounted therein.

16. A slat structure for rotatably mounting cotton picking spindles in a cotton harvester, said structure comprising, an elongated hollow member having an outer wall permanently bridging a pair of generally parallel side walls, said side walls presenting a series of longitudinally spaced peninsular portions, said outer wall having a longitudinally spaced series of apertures therethrough, an intermediate wall fixedly disposed between said side walls in transversely spaced parallel relation to said outer wall and being generally coextensive therewith, said intermediate wall having a longitudinal series of spaced apertures disposed in transverse registry with said apertures in said outer wall, transverse wall elements extending from said peninsular portions in substantially transverse alignment with the apertures in said intermediate wall, and means rigidly connecting the free aligned ends of each peninsular part to form a series of inner wall sections spaced apart longitudinally of said member.

17. The slat structure recited in claim 16 wherein each of said peninsular portions are provided with a horizontally aligned pair of ports, and a detachable clip element comprising, a pair of spaced wings extending parallel to each other, key portions mounted on said wings and adapted to be received in said ports, a web rigidly connecting ends of said wings, said bearing tab extending from said web at right angles thereto with said wings in flanking relation to said bearing tab.

18. A slat structure for rotatably mounting cotton picking spindles in a cotton harvester, said structure comprising, an elongated hollow member having an outer wall permanently bridging a pair of generally parallel side walls, said outer wall having a longitudinally spaced series of apertures therethrough, said side walls extending longitudinally beyond the ends of said outer wall, the terminal ends of said side walls having right angled portions inturned toward each other to form end walls in spaced relation to the terminal ends of said outer wall, said end wall and side walls defining an open-ended transversely extending passage at each end of said slat member, said side walls presenting a series of longitudinally spaced peninsular portions, an intermediate wall fixedly disposed between said side walls in transversely spaced parallel relation to said outer wall and being generally coextensive therewith, said intermediate wall having a longitudinal series of spaced apertures disposed in transverse registry with said apertures in said outer wall, transverse wall elements extending from said peninsular portions in substantially transverse alignment with the apertures in said intermediate wall, and means rigidly connecting the free aligned ends of each peninsular part to form a series of inner wall sections spaced apart longitudinally of said member.

19. A slat structure for rotatably mounting cotton picking spindles in a cotton harvester, said structure comprising, an elongated hollow member having an outer wall permanently bridging a pair of generally parallel side walls, said outer wall having a longitudinally spaced series of apertures therethrough, said parallel side walls extending longitudinally beyond the ends of said outer wall, the terminal ends of said side walls having right angled portions inturned toward each other to form end walls in spaced relation to the terminal ends of said outer wall, said end wall and side walls defining an open ended transversely extending passage at each end of said slat member, said side walls presenting a series of longitudinally spaced peninsular portions, an intermediate wall fixedly disposed between said side walls in transversely spaced parallel relation to said outer wall and being generally coextensive therewith, said intermediate wall presenting terminal ends each including a first offset portion extending parallel to and at a spaced distance from said end wall, and a second offset portion extending at right angles to said first offset portion and into said passage, said second offset portion having an aperture therethrough, said intermediate wall having a longitudinal series of spaced apertures disposed in transverse registry with said apertures in said outer wall, transverse wall elements extending from said peninsular portions in substantially transverse alignment with the apertures in said intermediate wall, and means rigidly connecting the free aligned ends of each peninsular part to form a series of inner wall sections spaced apart longitudinally of said member.

20. A slat structure for rotatably mounting cotton picking spindles in a cotton harvester, said structure comprising, an elongated hollow member having an outer wall permanently bridging a pair of generally parallel side walls, said side walls presenting a series of longitudinally spaced peninsular portions, said outer wall having a longitudinally spaced series of apertures therethrough, an intermediate wall fixedly disposed between said side walls in transversely spaced parallel relation to said outer wall and being generally coextensive therewith, said intermediate wall having a series of spaced apertures therethrough in transverse registry with said apertures in said outer wall, said intermediate wall having transverse wall segments extending therefrom in adjacent relation to said openings and toward said outer wall, transverse wall elements projecting from said peninsular portions in transverse alignment with the apertures in said intermediate wall, an inner wall section rigidly connecting each of said peninsular parts; a spindle assembly comprising, a spindle rod of less diameter than the apertures in said outer wall, an enlarged drive portion positioned on said rod intermediate the ends thereof, outer and inner bearings mounted about portions of said rod, respectively, adjacent the outer and inner ends of said drive portion, each spindle assembly being supported in said slat structure with its rod extending through an aperture in said outer wall, with said outer bearing nonrotatably and slidably mounted with an outermost end portion disposed in said aperture and a longitudinal side surface extending in contiguous relation to the proximate one of said transverse wall segments, and with said inner bearing nonrotatably mounted between said intermediate wall and the proximate one of said inner wall sections with its longitudinal side surface engaging the proximate one of said wall elements, and removable retaining means engaging said outer bearing and said intermediate wall for retaining said spindle assembly in said slat structure.

21. The slat assembly recited in claim 16 wherein said removable retaining means comprises a wear strip member having a configuration at one end thereof complementary to the inner end of said outer bearing, said wear strip being positioned with said configured end partially encircling said inner end, and having its opposite end in abutting relation to an opposite end of an adjoining said intermediate wall, and means biasing said wear strip member against said intermediate wall, thereby preventing movement of said outer and inner bearing relative to said slat member.

22. The slat assembly recited in claim 17 wherein said biasing means comprises a spring element having a tab portion and a bifurcated portion, said bifurcated portion having a pair of legs extending generally at right angles to said tab portion when said bifurcated portion is in biasing relation to said wear strip member.

References Cited in the file of this patent

UNITED STATES PATENTS

| | | |
|---|---|---|
| 2,440,450 | Rust | Apr. 27, 1948 |
| 2,533,631 | Rust | Dec. 12, 1950 |
| 2,548,069 | Rust | Apr. 10, 1951 |